(12) United States Patent
Savage et al.

(10) Patent No.: US 11,896,165 B2
(45) Date of Patent: Feb. 13, 2024

(54) RACK HOLDER

(71) Applicant: PITCO FRIALATOR, INC., Bow, NH (US)

(72) Inventors: Steven Savage, Concord, NH (US); Karl M. Searl, Newmarket, NH (US); Steven J. Cyr, Londonderry, NH (US); Steven Gallerani, Northwood, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 682 days.

(21) Appl. No.: 17/047,257

(22) PCT Filed: Apr. 16, 2019

(86) PCT No.: PCT/US2019/027655
§ 371 (c)(1),
(2) Date: Oct. 13, 2020

(87) PCT Pub. No.: WO2019/204294
PCT Pub. Date: Oct. 24, 2019

(65) Prior Publication Data
US 2021/0153695 A1    May 27, 2021

Related U.S. Application Data

(60) Provisional application No. 62/659,366, filed on Apr. 18, 2018.

(51) Int. Cl.
*A47J 45/10*    (2006.01)
*A47J 37/12*    (2006.01)

(52) U.S. Cl.
CPC .......... *A47J 45/10* (2013.01); *A47J 37/1295* (2013.01)

(58) Field of Classification Search
CPC .................................................. A47J 37/1295
See application file for complete search history.

(56) References Cited

U.S. PATENT DOCUMENTS

| | | | | |
|---|---|---|---|---|
| 606,904 | A | * | 7/1898 | Tubbs ..................... A47J 45/10 220/759 |
| 680,263 | A | * | 8/1901 | Maddux .................. A47J 45/10 294/27.1 |
| 1,004,312 | A | * | 9/1911 | Totty .................... B25J 15/0616 294/12 |
| 1,025,630 | A | * | 5/1912 | Von Krogoll ....... A47J 37/1295 99/410 |
| 1,083,808 | A | * | 1/1914 | Dunson ................... A47J 45/10 D7/688 |
| 1,254,551 | A | * | 1/1918 | Tucker .................... A47J 45/10 D7/395 |

(Continued)

*Primary Examiner* — Jason W San
(74) *Attorney, Agent, or Firm* — Seyfarth Shaw LLP; Brian Michaelis

(57) ABSTRACT

A rack holder configured to securely hold a rack or tray used to hold food items during cooking is described. The rack holder may include bracket with a lower lip and a top lip. The bracket may be affixed to a support bar with an offset portion extending downward. The support bar may also include a handle support portion where one or more handles are affixed to the rack holder. The rack holder may provide a fitting engagement with a rack to remove the rack from a cooking environment and to transport the rack to another preparation station.

17 Claims, 4 Drawing Sheets

(56) References Cited

U.S. PATENT DOCUMENTS

| | | | | |
|---|---|---|---|---|
| 1,334,510 A * | 3/1920 | Waterbury | ............... | B65G 7/12 294/26 |
| 2,473,082 A * | 6/1949 | Warner | ................. | A47K 13/10 4/246.3 |
| 3,272,547 A * | 9/1966 | Pryce | ...................... | A47J 45/08 220/759 |
| 4,215,667 A * | 8/1980 | Hsu | ........................ | F24B 1/202 126/25 AA |
| 4,482,181 A * | 11/1984 | Shepherd | ............ | A47J 37/0786 294/12 |
| D279,161 S * | 6/1985 | Gould | ............................ | D7/395 |
| D281,942 S * | 12/1985 | Bentson | ......................... | D7/674 |
| D295,717 S * | 5/1988 | Driscoll | .......................... | D8/300 |
| 4,955,650 A * | 9/1990 | Davey | ..................... | A47J 45/10 294/12 |
| 5,003,848 A * | 4/1991 | Ceccucci, Jr. | .......... | B25B 13/48 81/3.4 |
| 5,398,374 A * | 3/1995 | Betancourt | ........... | B65F 1/1623 16/110.1 |
| 5,459,889 A * | 10/1995 | Jamison | ............... | A47K 13/105 4/246.1 |
| 5,729,839 A * | 3/1998 | Bigelow | ............... | A47K 13/105 16/905 |
| 6,000,739 A * | 12/1999 | Zemit | ..................... | A47J 45/10 15/236.08 |
| 6,039,372 A * | 3/2000 | Noe | ..................... | A47J 37/0786 294/27.1 |
| 6,068,314 A * | 5/2000 | Dorazio | ................. | A47J 45/10 294/32 |
| D465,718 S * | 11/2002 | Sullivan | ......................... | D8/320 |
| D490,682 S * | 6/2004 | Sullivan | ....................... | D23/311 |
| 6,959,951 B2 * | 11/2005 | Amodeo | ............ | A47J 37/0786 294/7 |
| 6,966,100 B2 * | 11/2005 | Sonne | .................... | B26B 21/52 30/169 |
| 7,674,214 B2 * | 3/2010 | Marethouse | ....... | A63B 23/0405 482/126 |
| 8,029,034 B2 * | 10/2011 | Russi | .................... | B66F 11/00 294/15 |
| 8,365,377 B1 * | 2/2013 | Basiliere | ................ | B25B 27/16 269/143 |
| 8,465,068 B1 * | 6/2013 | Vinson, Jr. | .............. | A47J 45/10 294/32 |
| 8,556,310 B1 * | 10/2013 | Nabors | ............... | A47J 37/0786 294/9 |
| 8,627,550 B1 * | 1/2014 | Chung | ................... | A47J 45/00 294/9 |
| 9,615,696 B2 * | 4/2017 | Picken, Sr. | ........... | A47J 45/10 |
| D785,409 S * | 5/2017 | Japp | .............................. | D7/669 |
| D840,749 S * | 2/2019 | Zemel | .......................... | D7/395 |
| D857,447 S * | 8/2019 | Savage | ......................... | D7/393 |
| D943,372 S * | 2/2022 | Feit | ................................ | D8/14 |
| 2005/0052038 A1 * | 3/2005 | Coleman | ................ | F24C 15/16 294/10 |
| 2011/0314639 A1 * | 12/2011 | Herigstad | .............. | B25G 1/102 16/431 |
| 2012/0192724 A1 * | 8/2012 | Harrison | ................ | A47J 45/10 294/104 |
| 2012/0285337 A1 * | 11/2012 | Webb | .................... | A21C 11/00 99/439 |
| 2013/0233183 A1 * | 9/2013 | Brinckerhoff | ........... | A47J 37/12 99/403 |
| 2017/0258270 A1 * | 9/2017 | Man | ...................... | A47J 36/062 |
| 2018/0098665 A1 * | 4/2018 | Seurat | ................ | A47J 37/1295 |
| 2019/0336893 A1 * | 11/2019 | McGinnis | .......... | A47J 37/1223 |
| 2021/0153695 A1 * | 5/2021 | Savage | .................... | A47J 45/10 |
| 2022/0125245 A1 * | 4/2022 | Bauer | ................ | A47J 37/1295 |

\* cited by examiner

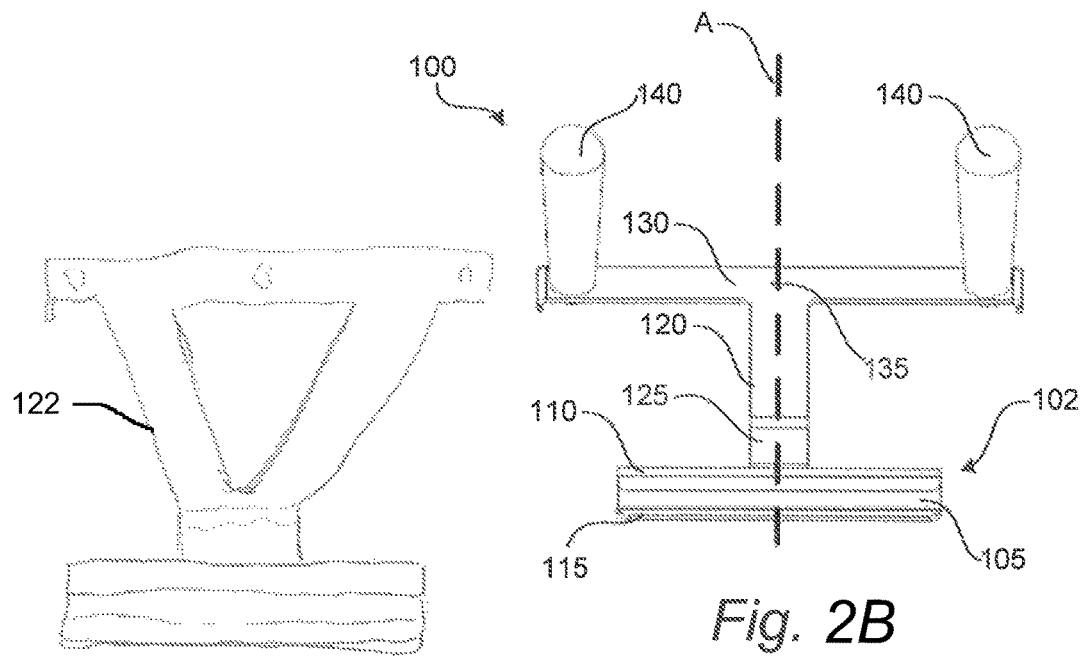
Fig. 2A
Fig. 2B
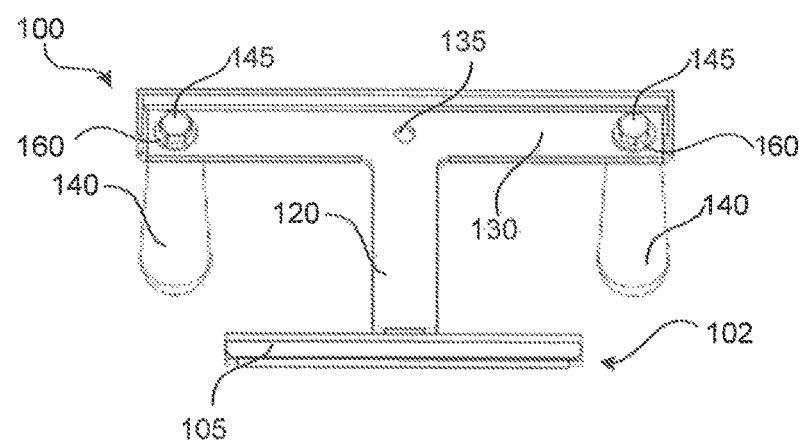
Fig. 3

RACK HOLDER

FIELD

The present disclosure relates to a rack holder, and more specifically to a device for manipulating a rack used in a heated cooking environment.

BACKGROUND

Racks and trays used to hold food items in ovens, deep fryers, and other heat-laden environments pose risks to operators who need to move or otherwise manipulate the racks to remove and transport the racks and the food on the racks from the cooking environment to another location, such as a preparation station or cooling area. Traditional oven and deep fryer racks are made of metal that collects and conducts heat supplied by the cooking environment. Known rack holders or devices that grasp or clamp onto racks or a portion of a rack may damage or weaken the structure of metal racks. Rack handles that may be built into a rack (i.e. are an integral portion of the rack structure) may also weaken over time and become broken or damaged because they protrude from the rack structure. Additionally, in a fryolator or deep frying environment, traditional heat protection devices and methods, such as oven mitts or gloves, are not practical as the rack or tray may be completely submerged in hot oil.

Further, oven and fryer racks are often disposed in a low lying area that requires an operator to bend awkwardly to secure or grasp a rack. The repetitive motion of bending and lifting racks loaded with heavy food items can cause injury and wear on the body of the operator. Traditional devices and methods allowing operators to grasp hot racks are also typically complicated structures with movable mechanical components, and they are not ergonomically designed or comfortable to use.

SUMMARY

Embodiments of the present disclosure include a rack holder configured to hold a rack or tray for holding food items allowing an operator to remove the rack from a cooking environment, such as an oven or deep fryer. According to one embodiment, a rack holder may include a bracket having an upper lip and a lower lip. The upper lip may extend downward substantially parallel to a wall of the bracket and the lower lip may extend upward from the wall of the bracket. A support bar including a distal portion may be affixed to the wall of the bracket at the distal portion. The support bar may be substantially perpendicular to the bracket. A handle support may be disposed at a proximate end of the support bar and may be substantially parallel to the bracket. At least one handle affixed to the handle support may also be included for an operator to hold the rack holder at the handle support.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which:

FIG. 2A is a front view of a rack holder according to an embodiment of the disclosure;

FIG. 2B is an alternative embodiment of a rack holder according to the disclosure;

FIG. 3 is a bottom view of a rack holder according to an embodiment of the disclosure;

DETAILED DESCRIPTION

The present disclosure provides an ergonomic rack holder suitable for use in holding, securing and transporting a rack, tray or other receptacle that may be incapable of being grasped or manipulated directly by an operator. In one exemplary use, the holder device may be implemented as a rack holder configured to engage a portion of a rack, and be used to move a rack holding food items from a cooking environment, such as an oven, deep fryer, fryolator, or the like. As used herein, the term rack may include a tray, plate, basket, or other receptacle in and on which food items may be placed. The rack holder may provide a safe, easy and ergonomic way of handling a rack to transport the food items from a cooking environment to a cooling or other food preparation station, without causing harm to the operator.

Figure 1:
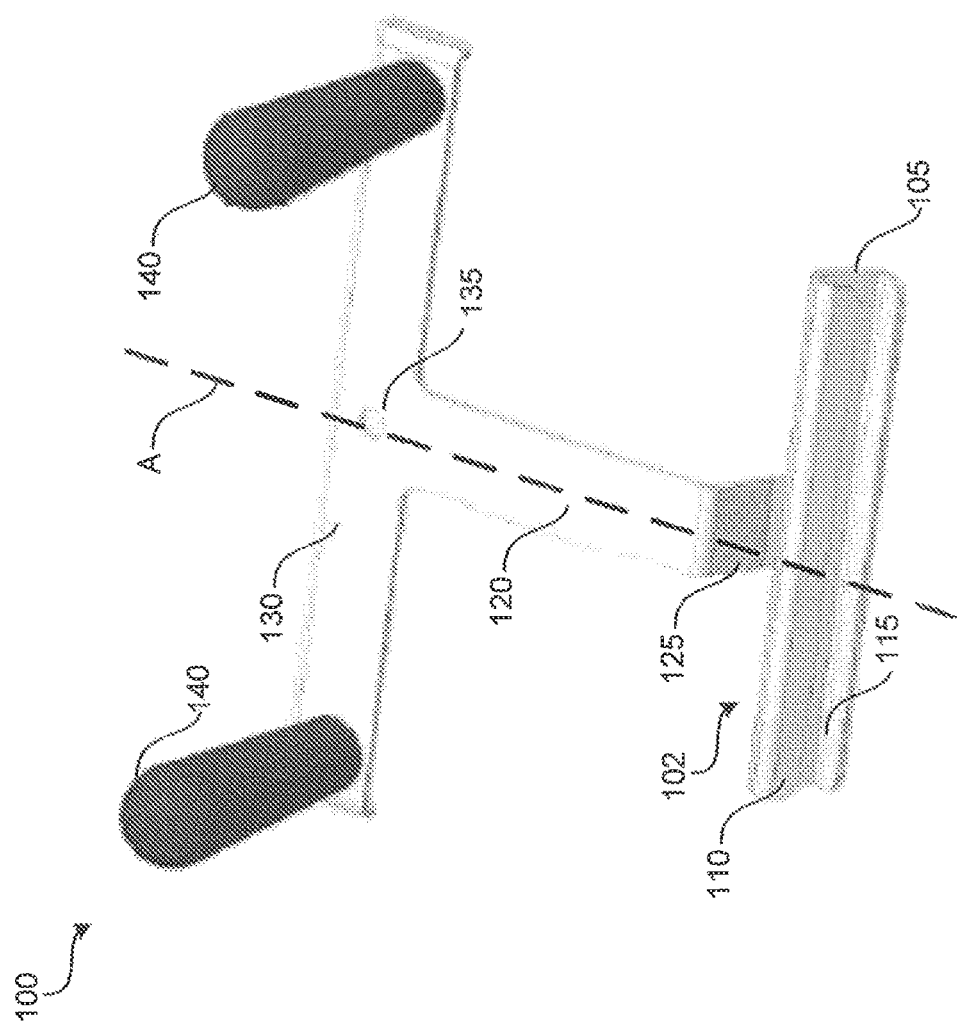
FIG. 1 is a perspective view of a rack holder according to an embodiment of the disclosure.

FIG. 1 is a perspective view of a rack holder 100 according to one embodiment. The rack holder 100 may include a bracket 102 connected to a support bar 120. The support bar 120 may include or be attached to a handle support 130 to which one or more handles 140 may be attached. The bracket 102, support bar 120 and handle support 130 may be formed from a metal or metal alloy such as stainless steel, aluminum, iron, or the like. The bracket 102, support bar 120 and handle support 130 may also be formed from Polytetrafluoroethylene (PTFE), which is a versatile and heat resistant material.

The bracket 102 may be substantially C-shaped with a rear wall 105, an upper lip 110 and a lower lip 115. The bracket 102 may be sized and shaped to receive an edge, wall, or other portion of a rack. As detailed below, the bracket 102 may engage with a rack such that the upper lip 110 retains a top edge of a rack wall, while the bottom lip 115 of the bracket 102 may retain or support a bottom edge or surface of the rack.

The bracket 102 may be affixed to the support bar 120 such that the side-to-side length of the bracket 102 is substantially perpendicular to an axis A of the support bar 120. The support bar 120 may be substantially flat, or rippled for extra stiffness, and include a distal portion 125 to which the bracket 102 may be affixed. The distal portion 125 may be offset from the support bar 120 and extend at an angle downward from the support bar 120. The bracket 102 may be welded to the distal portion 125 of the support bar 120 or may be affixed using other attachment techniques including, but not limited to, fasteners, soldering, forging, adhesives, or the like. The bracket 102 may alternatively be formed, via mold, extrusion, three-dimensional printing, or the like, as an extension of the support bar 120. The distal portion 125 may extend at a downward angle, relative to the support bar 120 and handles 140 to provide a more stable engagement between the rack and the rack holder 100 and provide a more comfortable posture for an operator carrying a rack, potentially laden with food items.

The support bar 120 may be affixed to, or include, a handle support 130. The handle support 130 may be a separate piece affixed to the support bar 120, or may be formed from the same piece of material as the support bar 120. The handle support 130 may extend substantially perpendicularly to the axis A of the support bar 120. The handle support may define one or more mounting positions, such as holes 135 for the receipt and mounting of one or more handles 140. According to the exemplary rack holder depicted in FIG. 1, the handle support 130 may include three mounting holes 135, spaced at opposite ends of the handle support (not shown) and in the center near or on the central axis A of the support bar. The three mounting holes 135 of the handle support 130 present the operator with an option of placing two handles 140 at opposite ends of the handle support 130, for a two-handed operation, or, placing a single handle, mounted through the mounting hole 135, in the center of the handle support 130, for a one-handed operation. Alternatively, three handles 140 may be installed, giving the operator a choice of operations without having to remove and reattach the handles 140. The handle support 130 may be sized and shaped to accommodate a desired number of handles. For example, if only a single handle is desired, the handle support 130 may be considerably smaller than that depicted in FIG. 1 so as to provide a smaller device footprint and not to consume valuable manufacturing materials.

The handle support 130 may include one or more handles 140 for operation and manipulation of the rack holder 100 and an engaged rack. The handles 140 may be mounted or otherwise affixed to the handle support 130 in a substantially perpendicular orientation with respect to the surface of the handle support 130. The handles 140 may be sized and shaped to provide a comfortable and engaging fit with an operator's hands. For example, the handles 140 may be tapered, and/or may include a gripping feature, such as ridges or grooves to receive the contours of the operator's fingers and palm. The handles 140 may be made from a metal, similar to that of the handle support 130, the support bar 124 and the bracket 102, or they may be made from another rigid and durable material such as wood, plastic or the like. The handles 140 may be rubberized or formed with foam on the exterior to more comfortably engage an operators hand(s).

FIG. 2A is a front view of a rack holder 100 according to an embodiment of the disclosure. From the front view, the alignment of the bracket 102, the support bar 120 and the handle support 130 may be readily observed. The width of the bracket 120 is substantially perpendicular to the central axis A of the support bar 120. Similarly the handle support 130 is substantially perpendicular to the central axis A of the support bar 120. As a result, the handle support 130 is substantially parallel to the bracket 102.

FIG. 2B illustrates an alternative embodiment of a rack holder 100' according to an embodiment of the disclosure. In the embodiment of FIG. 2B, the support bar 120 of FIG. 2A is replaced by an A-shaped support structure 122. The A-frame structure may provide additional strength and/or stability to the rack holder, and may also provide the potential to use lighter-weight materials and attain structural stability.

FIG. 3 is a bottom view of a rack holder 100 according to an embodiment of the disclosure. As shown, the handles 140 may be mounted to the handle support 130 using bolts 145, and washers 160. The bolts 154 may extend through the mounting holes 135 and into a securing engagement with the handles 140. The handles 140 may include or define threaded recesses through a center axis of the handle 140 for receiving the bolt 145. Alternatively, the handles 140 may be formed with threaded extensions extending from the bottom of the handle 140 and threaded/inserted into the mounting holes 135. In such a implementation, washers 160 and nuts or other securing fasteners may be engaged with the threaded extensions to secure the handles 140 to the handle support 130. Alternatively, the mounting holes 135 may be machined or otherwise threaded such that the threads of the threaded extensions directly engage the mounting holes 135 forming a secure attachment. The handles 140 may be affixed to the handle support 130 through any number of fastening techniques, including adhesives, welding, forging, soldering or the like. Alternatively, the handles 140 may be formed, via mold, extrusion three-dimensional printing, or the like, as part of the handle support 130.

Figure 4:
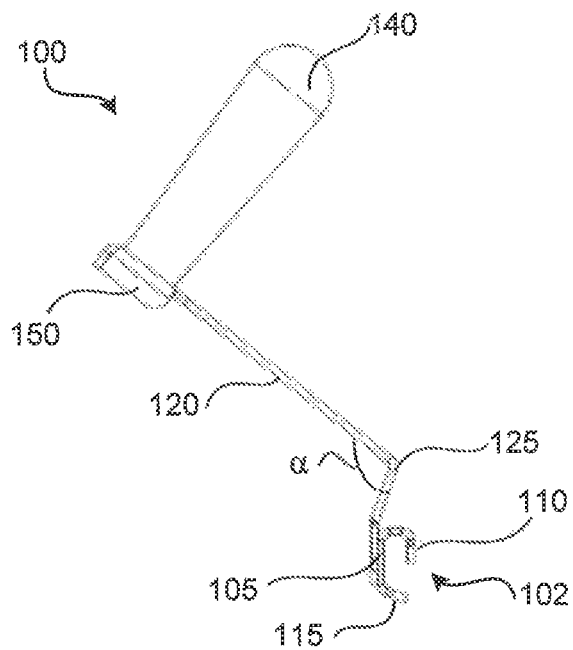
FIG. 4 is a profile view of a rack holder according to an embodiment of the disclosure.

FIG. 4 is a side profile view of a rack holder 100 according to an embodiment of the disclosure. As depicted in profile, the bracket 102 may be substantially C-Shaped with an upper lip 110 extending downward from the top of the bracket, such that the upper lip 110 is substantially parallel to the rear wall 105 of the bracket 102. The lower lip 115 may extend downwardly from the rear wall 105 at an obtuse angle, just over 90-degrees, in relation to the wall 105. The upper lip 110 and C-shaped portion of the bracket 102 may be appropriately sized to receive a portion of a fryer basket, such as a side rail or integrated handle. The lower lip 115 may extend downwardly at an angle and for a distance appropriate to engage a bottom of the fryer basket or a lower side rail or section of an integrated handle.

The distal portion 125 of the support bar 120 may be formed at an angle, α, extending downward in a direction substantially opposing the direction of the handles 140. The angle, α, between the distal portion 125 and the support bar 120 may be about 90-degrees, or more. An obtuse angle, as shown, just over 90-degrees may provide an advantageous and ergonomic angle by which the rack holder 100 may be rotated and manipulated about a rack and maintain the rack in a substantially planar orientation when engaged with the rack holder 100. The angle, α, between the support bar 120 and the distal portion 125 may be formed at various angles depending on the intended use, operator need, rack configuration considerations, or other item configurations to be grasped by the rack holder 100.

The handle support 130 may further include a rim 150 extending around the outer perimeter of the handle support 130. The rim 150 may extend substantially perpendicularly downward from the handle support 130. The rim 150 may provide a uniform resting surface for the rack holder, preventing any wobbling or tilting that may arise from uneven bottom surfaces of the bolts 145, handle support 130 or other surfaces of the rack holder 100. The rim may also obscure the bolts 145, or other fastening features of the handles 140 to present a more aesthetically attractive, squared design. The rim 150 may also serve to protect an operator's hands from any sharp edges or features of the fasteners. The rim 150 may be formed from the same piece of material as the handle support 130 and bent or otherwise manipulated during manufacture to form the downward right-angle, or the rim may be formed from additional material and affixed to the handle support 130 using any known mounting or attachment techniques.

Figure 5:
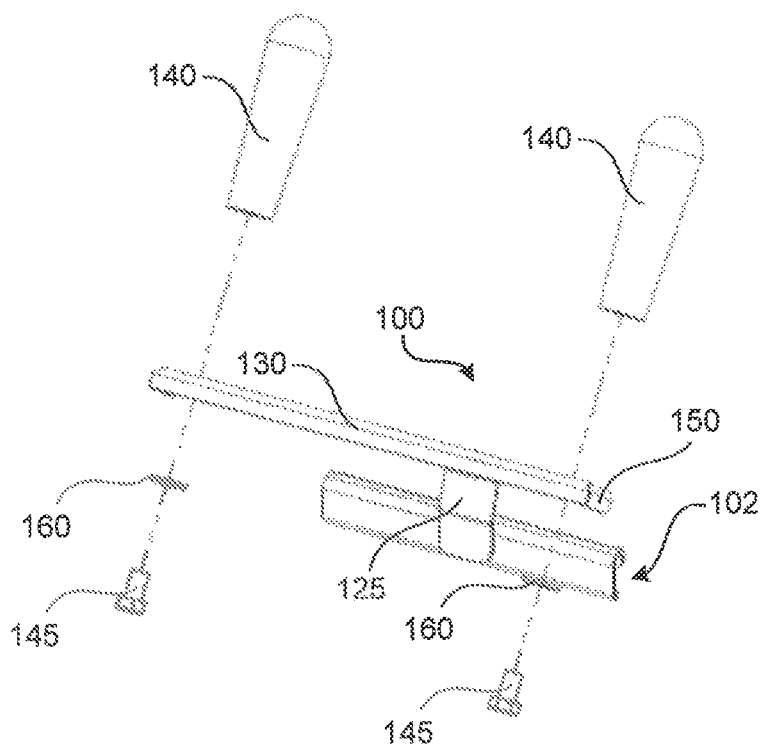
FIG. 5 is an exploded view of a rack holder according to an embodiment of the disclosure.

FIG. 5 is an exploded view of a rack holder 100 according to an embodiment of the disclosure. FIG. 5 depicts the components of the rack holder 100 as they may be assembled. A bolt 145 may be inserted through a washer 160 and through the mounting hole 135. The handles 140 may include or define a threaded recess for receiving the threaded grooves of the bolts 145. As explained above, the handles 145 may be affixed to the rack holder 100 using any number of techniques by which the handles 145 are securely attached to the handle support 130. Alternatively, the handles 140 may be formed from the same piece of material, or as a single piece, as the handle support 130. The handles 140 may include covers or other protective materials that protect the hands of an operator. For example, if the handles 140 are formed from a metal or other conductive material, non-conductive and insulating handle covers made from neoprene, rubber, cotton, or the like may be placed over the handles to insulate the operator's hands from heat transferred from the rack through the bracket 102, the support bar 120, the handle support 130, and the handles 140.

Figure 6:
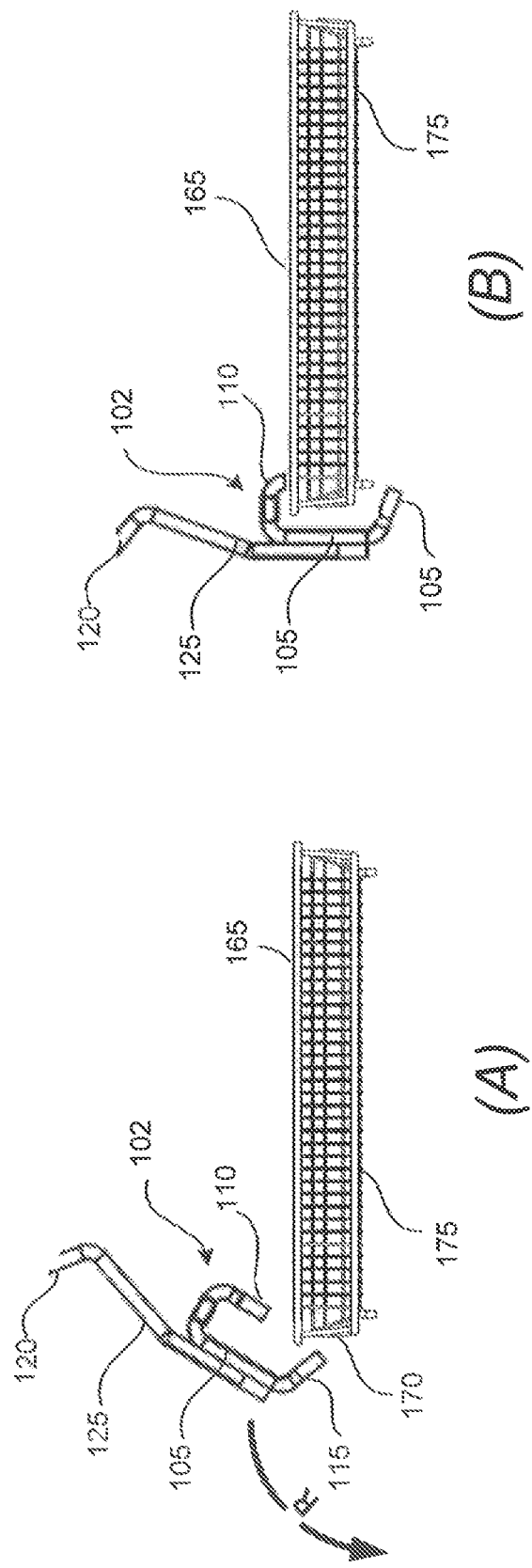
FIGS. 6A-6B are enlarged, profile views of a bracket and rack engagement according to one embodiment of the disclosure.

FIGS. 6A-B are enlarged, profile views of a bracket 102 and a rack 165 engagement according to one embodiment of the disclosure. FIG. 6A depicts the bracket 120 of the rack holder 100 prior to engagement with the rack 165. As described above, the bracket 102 may be sized and shaped to engage with a rack wall 170. For example, the upper lip 110 may extend from the rear wall 105 of the bracket to receive the top edge of the rack wall 170. The operator may lower the bracket 102 of the rack holder 100 onto the rack wall 170 and rotate the rack holder 100 down and back towards the operator, as shown by the directional arrow 'R'.

FIG. 6B depicts the bracket 102 of the rack holder 100 in proximate engagement with the rack 165. The rack wall 170 is secured by the upper lip 110 and the rear wall 105 of the bracket 102. The bottom lip 115 may be sized and shaped to provide a fitting support to a bottom edge or surface 175 of a rack 165 after the top edge of the rack 165 is engaged by the upper lip 110 of the bracket 102 and the rack holder 100 is rotated down. The lower lip 115 of the bracket 102 may rotate under the rack 165 and provide additional support to the rack wall 170 or the bottom surface 175. The bracket 102 may be sized and shaped to provide a slightly loose fit about the rack wall 170 so as to allow the movement and rotation of the rack holder 100 about the rack edges to create the engagement. When the operator lifts the rack holder 100, a distal end of the rack 165 may drop, however the fitting engagement of the rack wall 170 with the bracket 102, upper lip 110 and lower lip 115 will prevent the rack 165 from falling further, and provide a stable hold such that the operator can remove the rack 165 from the cooking environment and transport the rack 165 and any food items on the rack 165 to a cooling or other food preparation station.

Alternative configurations for engaging a rack with the rack holder are contemplated herein. For example, a rack may be configured with upper and lower integrated handle portions whereby the upper portion (which may be circular, rectangular, square or another geometric shape) is engaged by the upper lip of the C-shaped portion of the bracket 102 and the lower lip of the C-shaped portion of the bracket 102 may engage the lower integrated handle portion (which may be circular, rectangular, square or another geometric shape).

While embodiments disclosed herein describe a rack holder made or formed from a metal, one of ordinary skill in the art will appreciate that any number of materials, including, metal alloys, steel, stainless steel, cast iron, ceramic, porcelain, or the like, may be used to form the components of the devices disclosed.

Further, while various components or pieces have been described herein as discrete components of the devices disclosed, one of ordinary skill in the art will appreciate that the devices may be formed or manufactured as a single piece, via mold, extrusion, three-dimensional printing, or the like, or may be formed from several pieces and connected, affixed, or attached by any number of known techniques.

While embodiments disclosed herein describe a rack holder or rack holder for use in removing a rack of food items from a cooking environment, one of ordinary skill in the art will appreciate that the disclosure is not limited only to those exemplary uses and the devices described herein may be implemented in a variety of other areas and environments without deviating from the scope of the disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the description and following claims, it is understood that terms such as "first," "second," "third," "above," "below," and the like, are words of convenience and are not to be construed as limiting terms unless expressly stated otherwise.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

The invention claimed is:
1. A rack holder comprising:
    a bracket having an upper lip and a lower lip, the lower lip extending from a wall of the bracket; the upper lip extending downward substantially parallel to the wall of the bracket;

a support bar including a distal portion affixed to the wall of the bracket, the support bar substantially perpendicular to the bracket;

a handle support disposed at a proximate end of the support bar, the handle support substantially parallel to the bracket and the handle support defining at least one mounting hole including at least a first mounting hole in a left side of the handle support and a second mounting hole in a right side of the handle support; and at least one handle affixed to the handle support.

2. The rack holder of claim 1 wherein the distal portion of the support bar extends downward from the support bar at an obtuse angle.

3. The rack holder of claim 1 wherein the lower lip of the bracket extends from the wall of the bracket at an obtuse angle from the wall.

4. The rack holder of claim 1 wherein the at least one mounting hole is defined in the center of the handle support in line with the support bar.

5. The rack holder of claim 1 wherein the at least one handle defines a threaded recess, the at least one handle affixed to the handle support using a threaded bolt extending through the at least one mounting hole and into the threaded recess.

6. The rack holder of claim 1 wherein the at least one handle includes a threaded bolt extending through the at least one mounting hole and secured to the handle support with a nut.

7. The rack holder of claim 1 wherein the at least one mounting hole is threaded and the at least one handle comprises a threaded extension, the handle affixed to the handle support by the threaded engagement of the mounting hole with the handle extension.

8. The rack holder of claim 1 further comprising a first handle disposed on a left side of the handle support and a second handle disposed on a right side of the handle support.

9. The rack holder of claim 1 wherein the at least one handle is tapered.

10. The rack holder of claim 1 where in the at least one handle comprises a cover.

11. The rack holder of claim 1 wherein the at least one handle comprises a gripping feature.

12. The rack holder of claim 1 wherein the bracket is welded to the distal portion of the support bar.

13. The rack holder of claim 1 wherein the bracket, support bar and handle support are formed from a single piece of material.

14. The rack holder of claim 1 wherein the at least one handle is disposed in the center of the handle support and in line with a central axis of the support bar.

15. A rack holder comprising:
a bracket configured to engage a portion of a rack;
a support bar including a distal portion affixed to the bracket, the support bar substantially perpendicular to the bracket;
a handle support disposed at a proximate end of the support bar, the handle support substantially perpendicular to the support bar and the handle support including at least a first and second mounting hole, the first and second mounting holes disposed on opposing sides of the support bar to receive a first handle and a second handle; and
at least one handle affixed to the handle support, the at least one handle being substantially perpendicular to a surface of the handle support.

16. The rack holder of claim 15 wherein the bracket has an upper lip and a lower lip, the lower lip extending from a wall of the bracket; the upper lip extending downward substantially parallel to the wall of the bracket.

17. A rack holder comprising:
a bracket having an upper lip and a lower lip, the lower lip extending from a wall of the bracket, the upper lip extending downward substantially parallel to the wall of the bracket;
a support bar including a distal portion affixed to the wall of the bracket, the support bar substantially perpendicular to the bracket;
a handle support disposed at a proximate end of the support bar, the handle support defining at least one mounting hole including at least a first mounting hole in a left side of the handle support and a second mounting hole in a right side of the handle support; and
a first handle affixed to the handle support, the handle substantially perpendicular to a surface of the handle support.

* * * * *